United States Patent [19]

Ohlhaver

[11] 4,039,073
[45] Aug. 2, 1977

[54] PUSH-ON DEVICE

[76] Inventor: Homer W. Ohlhaver, Box 308, Walhalla, Mich. 49458

[21] Appl. No.: 674,646

[22] Filed: Apr. 7, 1976

[51] Int. Cl.² .......................................... B65G 47/52
[52] U.S. Cl. ................................... 198/430; 198/740
[58] Field of Search .......... 198/31 R, 31 AA, 31 AB, 198/31 AC, 430, 487, 740

[56] References Cited

U.S. PATENT DOCUMENTS

| 1,436,455 | 11/1922 | Mingle | 198/31 AA |
|---|---|---|---|
| 1,871,675 | 8/1932 | Ermold | 198/31 AA |
| 2,124,397 | 7/1938 | Gwinn et al. | 198/31 AA |
| 2,135,986 | 11/1938 | Morton et al. | 198/31 AA |
| 2,217,982 | 10/1940 | Heil et al. | 198/31 AA |
| 2,464,530 | 3/1949 | Reimers | 198/31 AA |
| 2,601,914 | 7/1952 | Davies | 198/31 AA |
| 2,679,310 | 5/1954 | Lunn | 198/31 AA |
| 3,184,031 | 5/1965 | Dunlap | 198/24 |
| 3,687,262 | 8/1972 | Campbell et al. | 198/31 AA |
| 3,960,266 | 6/1976 | Becker | 198/31 AB |
| 3,994,387 | 11/1976 | Zappia | 198/430 |

FOREIGN PATENT DOCUMENTS 373,695   1/1964   Switzerland ................... 198/31 AB Primary Examiner—Evon C. Blunk
Assistant Examiner—Richard K. Thomson
Attorney, Agent, or Firm—Hill, Gross, Simpson, Van Santen, Steadman, Chiara & Simpson

[57] ABSTRACT

A device for pushing onto a take-away conveyor or the like a succession of row groups of articles by displacing the articles laterally from a conveyor on which the articles are continuously advanced seriatim, and comprising a push bar of a length to engage an entire row group of the articles, driving arms attached adjacent to opposite ends of the bar, means for actuating the arms oscillatingly and reciprocatingly, and means for guiding the oscillating arms reciprocatingly, the arms as actuated and guided by the actuating and guiding means moving the bar in an orbital cycle to meet and engage an advancing row group and advance with the group while applying a push laterally of the conveyor across the line of travel of the articles until the engaged row group is pushed from the conveyor, and then returning the bar to meet and engage a succeeding row group of articles to repeat the cycle.

16 Claims, 6 Drawing Figures

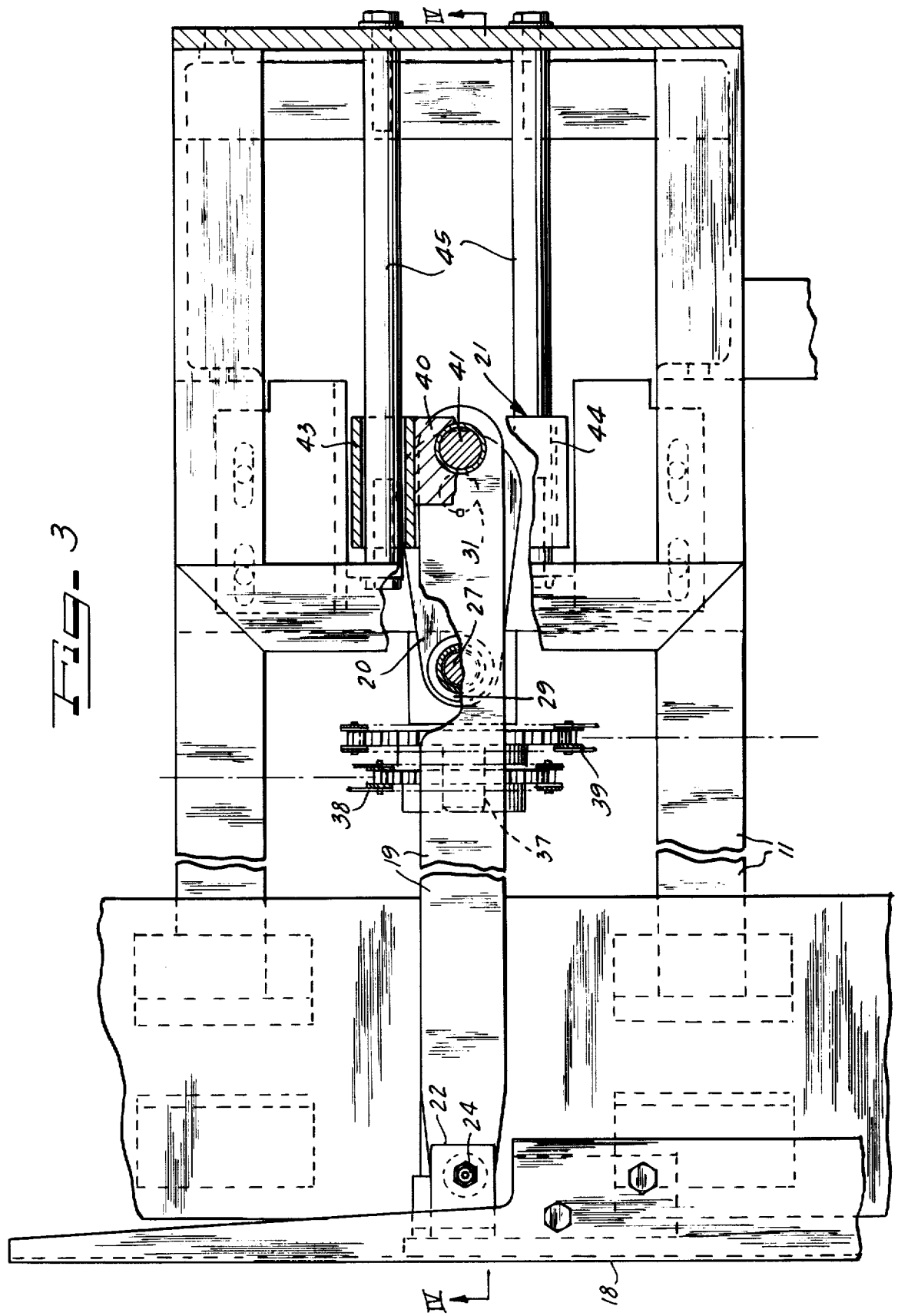

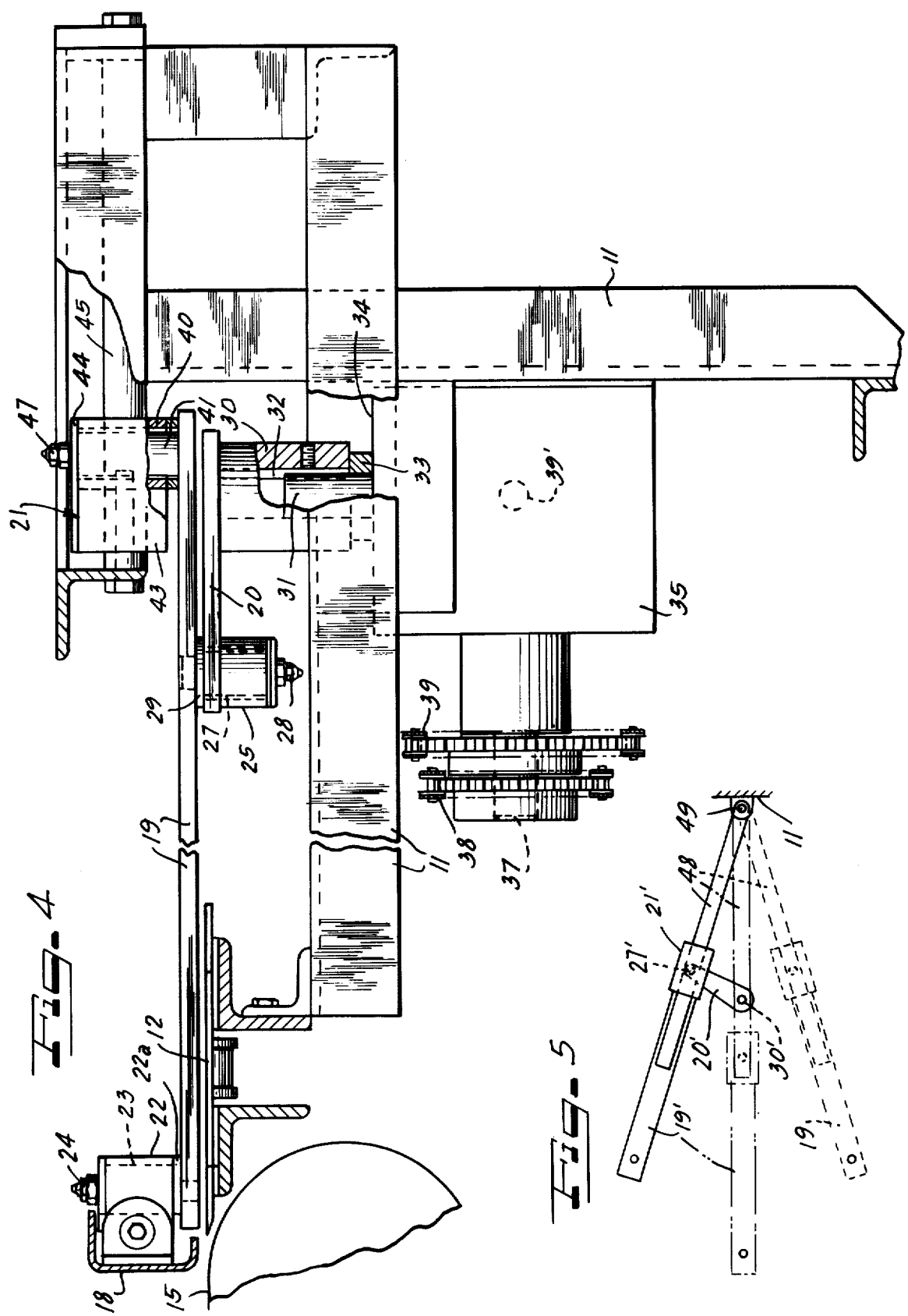

PUSH-ON DEVICE

This invention relates to push-on devices and is more particularly concerned with such devices adapted to push onto a take-away conveyor or the like a succession of row groups of article by displacing the articles laterally from a conveyor on which the articles are continuously advanced seriatim.

Certain processes require transfer of articles from one conveyor to another conveyor or the like by groups. For example, in the canning industry, containers on the order of cans or jars may be advanced seriatim along a conveyor from which the containers must be transferred by row groups onto another conveyor such as may transport the articles to or through cooking, steaming, cooling or other processing apparatus. Accordingly, the articles are advanced in single file to a so called push-on device where a push bar engages an entire row group of the articles and moves the row group from the single file conveyor on which the articles are conveyed by groups in a direction transversely from the single file conveyor.

prior push-on devices have had several drawbacks and disadvantages. Insofar as I am imformed, all such devices heretofore have required excessive room for cycling of the push bar. Some such devices have required such wide sweep of the push bar as to be at least inconvenient, and generally present a hazardous situation for operating personnel.

An important object of the present invention is to overcome the foregoing and other disadvantages, deficiencies, inefficiencies, shortcomings, and problems in prior devices of the kind indicated, and provide substantial improvements in structure, operation and efficiency.

Another object of the invention is to provide a new and improved push-on device in which the push bar operates in a minimum orbital cycle.

A further object of the invention is to provide a new and improved push-on device which is easily adaptable for various conditions as to conveyor sizes, article sizes, operating speeds and the like.

According to features of the invention, there is provided a device for pushing onto a take-away conveyor or the like a succession of row groups of articles by displacing the articles latterally from a conveyor on which the articles are continuously advanced seriatim, the device comprising a push bar of a length to engage an entire row group of the articles, driving arms being attached adjacent to respective opposite ends of the bar, means for actuating the arms oscillatingly and reciprocatingly, and means for guiding the oscillating arms reciprocatingly, the arms as actuated and guided by the actuating and guiding means moving the bar in an orbital cycle to meet and engage an advancing row group of articles and advance with the group while applying a push laterally of the conveyor across the line of travel of the articles until the engaged row group is pushed from the conveyor, and then returning the bar to meet and engage a succeeding row group of articles to repeat the cycle.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 3 is an enlarged fragmental sectional plan view of a portion of the push-on device, at the right side of FIG. 1.

FIG. 4 is a vertical sectional elevational fragmental detail view taken substantially along the line IV—IV of FIG. 3.

FIG. 5 is a schematic illustration of a modification in the guide means for the push bar driving arms.

Figure 1:
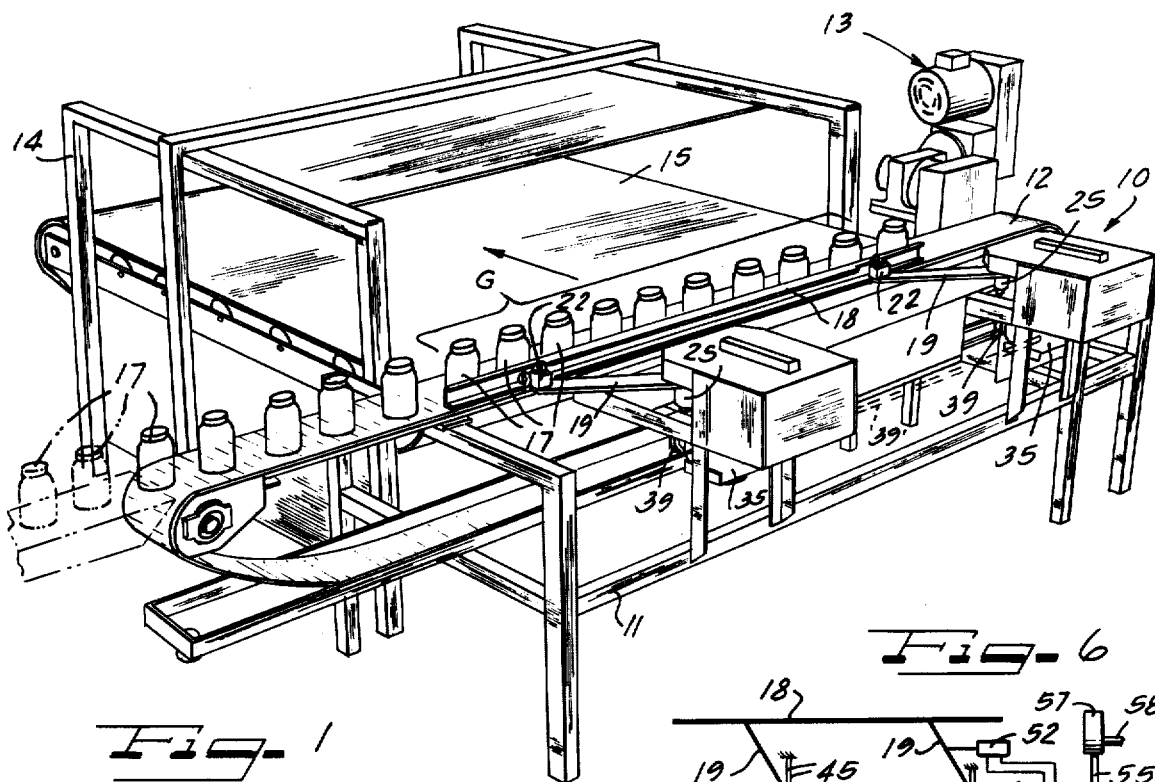
FIG. 1 is a perspective view of apparatus including a push-on device embodying features of the invention.

Referring to FIG. 1, a push-on device 10 embodying features of the invention is mounted on a supporting frame 11 in operating relation to a linear, single line endless conveyor 12, in this instance also supported on the frame 11. A suitable power source unit 13 may also be carried by the frame 11 for driving the push-on device 10 and the conveyor 12 in coordinated relation. Construction of the frame 11 is such that it can be placed in stable relation to means including a frame 14 supporting a broad endless belt take-away transporting conveyor 15 to receive and convey away from the single line conveyor 12 a succession of row groups G or articles such as canned goods gars 17 displaced by the push-on device 10 from the conveyor 12 on which the articles are continuously advanced seriatim from any desired source.

As a principal component, the push-on device 10 comprises a horizontal push bar 18 of a length to engage the entire row group G of the articles 17. For high speed production, it is not practical to halt the conveyor 12 each time an article group G on the conveyor 12 lines up to be pushed onto the conveyor 15. Therefore, it is necessary to actuate the push bar 18 in such manner that it will meet and engage the advancing row group C of articles before the group reaches the point of alignment with the conveyor 15.

Figure 2:
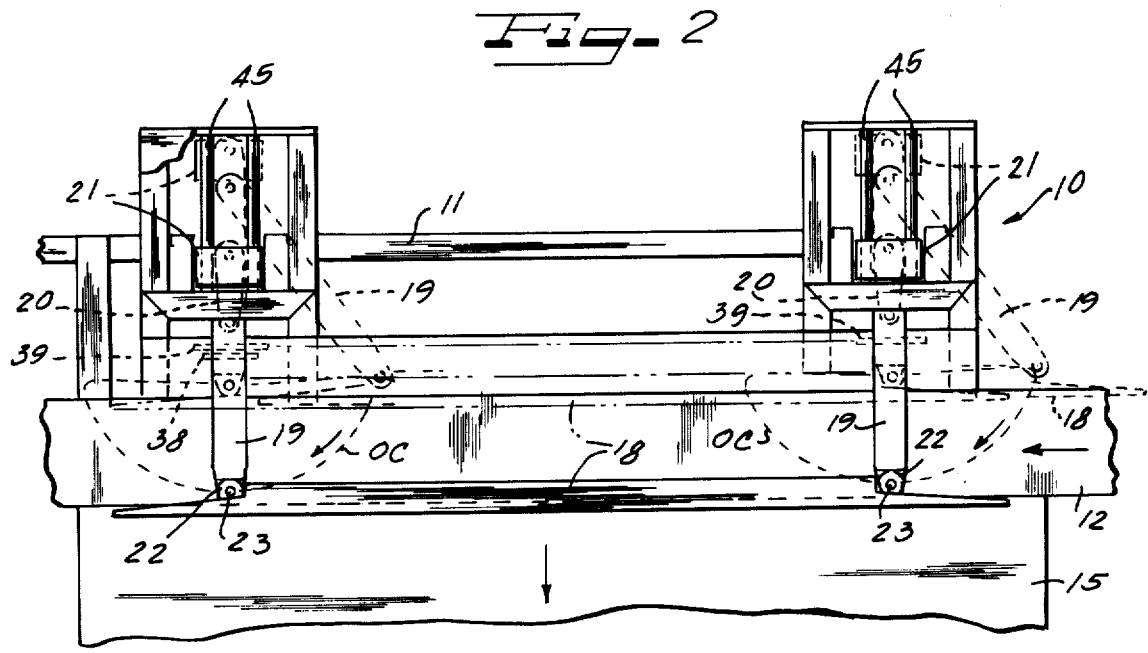
FIG. 2 is a schematic top plan view illustrative of operation of the push-on device.

After meeting the group G, the bar 18 must act to progressively displace the group of articles G toward the push-off side of the conveyor 12 while traveling with the conveyor until the group lines up with the conveyor 15. Thereupon the entire group G must be pushed from the conveyor 12 onto the conveyor 15 and the bar 18 must escape the next continuously advancing group of containers and return into container-group-engagement with the succeeding group as it enhances uninterruptedly to alignment on the conveyor 12 with the transverse take-away conveyor 15. To this end, respective substantially horizontal driving arms 19 (FIG. 2) are attached adjacent to respective opposite ends of the bar 18, means suitably comprising respective crank arms 20 (FIGS. 3 and 4) are provided for actuating the arms 19 oscillatingly, and means including a linear guide 21 are provided for guiding the oscillating arms reciprocatingly. Through this arrangement, the arms 19 as actuated and guided by the actuating means 20 and the guiding means 21 move the bar 18 in an orbital cycle OC (FIG. 2) to meet and engage the advancing row group G of the articles 17 and advance with the group while applying a push laterally of the conveyor 12 across the line of travel of the articles and until the engaged row group is pushed from the conveyor 12, then returning the bar 18 to meet and engage a succeeding row group of articles to repeat the cycle. This is accomplished with minimum travel of the push bar 18 coordinated with the speed of travel of the conveyor 12 from adjacent the side of the conveyor 12 which is remote from the side toward which and from which the containers must be pushed to a position wherein the engaged article are completely displaced from the conveyor 12 onto the conveyor 15, the bar 18 then returning without interruption to the starting position. Throughout the orbit OC, the bar 18 preferably remains substantially parallel to a substantially straight line path of travel of the articles 17 on the conveyor 12.

The push bar 18 should be of a suitable construction which is as light weight as practical but of ample rigidity. It may be of channel shape as best seen in FIG. 4, or it may be shaped or adjustable to match particular container contours such as tapered, etc. For pivotal attachment of the bar 18 to the driving ends of the arms 19, respective pivot blocks 22 are fixedly carried by the back side of the bar adjacent to, but spaced from, the respective opposite ends of the bar. Thereby, the bar 18 is adapted to be carried by the driving ends of the arms 19 by bearing of the pivot blocks 22 through thrust bearing means 22a on the upper faces of the ends of the arms, with respective pivot members 23 projecting upwardly from the arms in journaled relation within the blocks 22. Grease fittings 24 are on the upper sides of the blocks 22 for lubricating the pivots.

In the illustrated example, the driving arms 19 are coextensive and parallel and of horizontally flattened bar form and supported by the actuating crank 20 and the guide 21 to carry the bar 18 in generally cantilever fashion to sweep over the conveyor 12 in fairly close relation. Each of the cranks 20 has a throw or orbital diameter to accommodate the full desired reciprocating range of the push bar 18. At its driving end each of the cranks 20 is provided with a pivot block 25 into which extends a vertical pivot member 27 fixed to the associated arm 19, a grease fitting 28 being carried by the block for lubricating the pivot. Thrust load of the arm 19 is carried by means of a thrust bearing 29 concentric with the pivot 27.

At its proximal end, the crank 20 in each instance is supported by means of a rigid depending coupling sleeve 30 which is suitably keyed to a vertical stub shaft 31 extending upwardly into the coupling sleeve and keyed thereto as by means of keying means 32. A thrust bearing spacer 33 at the lower end of the sleeve 30 is carried by a support structure 34 on the frame 11. The shaft 31 comprises part of a driving mechanism which may include a gear box 35 into which extends a horizontal driving shaft 37 suitably rotatably driven by power derived from the power source means 13 such as through a chain and sprocket drive 38, therebeing coupling means, such as a chain and sprocket drive assembly 39 on and between the shafts 37 of the drives 35 for the two cranks 20, whereby the cranks are driven in unison, By having the conveyor 12 and the cranks 20 driven by the same power means 13, synchronized actuation of the conveyor and the push bar 18 is conveniently facilitated.

In a desirable arrangement, the linear guide 21 for each arm 19 includes a guide block 40 within which is received a pivot pin 41 projecting rigidly upward from the proximal end of the arm 19 Fixedly carrying the block 40 is a pair of parallel front to rear axis horizontal slide guide sleeves 43 secured to the opposite sides of the block 40 and the entire assembly of block 40 and sleeves 43 being reinforced as a unit by a connecting plate 44. Front to rear fixed rectilinear track means for guide 21 comprise spaced parallel coextensive track rods 45 supported by the frame 11 and along which the guide sleeves 43 travel slidably for reciprocatingly guiding the associated driving arm 19. Lubrication of the pivot 41 and the guide sleeves 43 is effected through a grease fitting 47.

In a modified guiding means arrangement as depicted in FIG. 5, the driving arms 19' may have the associated linear guide 21' in each instance, or selectively, secured fixedly thereto in the form of a slide linearly reciprocable on a guide bar 48 which is connected at its proximal end by means of a pivot 49 to the frame 11. To effect reciprocations during oscillations of the arm 19', the driving pivot 27' of the crank 20' is coupled to the slide 21'.

Although chain and sprocket driving means have been disclosed, including the coupling chain drive 39 for and between the respective drive 35 for the push bar arms 19, other drive coupling means may be substituted, such as a coupling shaft 39' (FIGS. 1 and 4), connected to and between the drive devices 35. In such an arrangement, of course, power input may be effected through either of the shafts 37 in any preferred manner, such as, but not limited to the driving chain and sprocket means 38.

Figure 6:
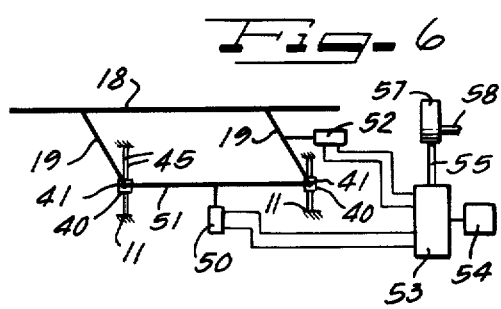
FIG. 6 is a schematic illustration of a modified driving system for the device.

Other means may be employed for actuating the push bar driving arms 19 if desired. For example, as represented in FIG. 6, the actuating arms 19 for the push bar 18 may be actuated reciprocatingly by means of an actuator 50 suitably coupled to the guide blocks 40 as by means of a coupling cross bar 51 fixedly attached at its opposite ends to the blocks 40 and with the actuator 50 attached to substantially the midpoint along the length of the bar 51. The push bar 18, the arms 19 and the coupling bar 51 are thus connected in a generally parallelogram relationship. Actuating means for the arms 19 may include, in addition, an actuator 52 driving the arms oscillatingly. As shown, only one actuator 50, and one actuator 52 will suffice to effect the compound movements of the push bar 18, but additional actuators may be employed in suitable circumstances. Although the actuators 50 and 52 may comprise any suitable mechanical devices, such as cranks on the order of the cranks 20, cams, or the like, in a desirable arrangement the actuators 50 and 52 comprise fluid actuated devices, more particularly in the form of air cylinder actuators connected through suitable valve means 53 with a source 54 of compressed air, such as an air compressor. For operation of the valve 53 to control the actuators 50 and 52 to drive the push bar 18 in timed relation to the associated conveyor 12, a valve operating device such as a plunger and follower 55 may be normally biased toward a control cam 57 driven as by means of a shaft 58 drivingly connected with the power means 13.

If for any reason it is desired to vary the stroke or orbital pattern of the push bar 18, suitable variation may be effected in the length or pivot locations of either or both of the actuating means cranks 20 or 20', or the actuators 50, 52, as the case may be. Various additional orbital patterns may be effected by inserting suitable linkage means and, if necessary motion, controlling means, springs, and the like, into the push bar driving system.

From the foregoing it will be apparent that the device of the present invention is adaptable for numerous and varied operating requirements to obtain utmost efficiency in operation of the push bar 18.

It will be understood that variations and modifications may be effected without departing from the spirit and scope of the novel concepts of this invention.

I claim as my invention:

1. A device for pushing onto a take-away conveyor or the like a succession of row groups of articles by displaying the articles laterally in one direction from a delivery conveyor on which the articles are continuously advanced seriatim, comprising:

a supporting structure carrying said delivery conveyor;

a horizontal push bar of a length to engage an entire row group of the articles;

substantially horizontal driving arms pivotally attached to adjacent respective opposite ends of the bar and extending rectilinearly from the bar in the opposite lateral direction relative to the delivery conveyor;

respective guide block means attached to and movable with that end portion of each of the arms which is remote from the bar;

rectilinear guide track means for each of said arms attached to said supporting structure adjacent to said remote ends of the arms and spaced from said delivery conveyor and extending on parallel axes transverse to said delivery conveyor;

said guide block means being supported on and running along said guide track means and guiding said arms reciprocatingly for controlling movement of said bar transversely relative to said delivery conveyor; and operating means connected to said arms for effecting cyclical oscillation and reciprocation of the arms the motion of said arms occuring substantially in a horizontal plane;

said arms as oscillated and reciprocated by said operating means and guided by said guide block and track means moving the bar in an orbital cycle to meet and engage an advancing row group of articles carried by the delivery conveyor and then advancing with the row group while applying a push laterally of the conveyor in said one direction across the line of travel of the articles until the engaged row group is pushed from the conveyor, and the bar then returning to meet and engage a succeeding row group of articles to repeat the cycle.

2. A device according to claim 1, wherein said operating means comprise cranks pivotally attached drivingly to the arms, and means for driving the cranks.

3. A device according to claim 2, including means for synchronizing driving operation of the cranks.

4. A device according to claim 1, wherein said arms are supported cantilever fashion by at least said guide block means, said push bar being supported by the distal ends of the arms.

5. A device according to claim 1, wherein said guide block means comprise slides attached to the proximal ends of the arms, and said track means comprising elongate track members on which the slides are slidably mounted.

6. A device according to claim 5, including pivot means connecting the arms to the slides, and said slide track members comprise fixed tracks.

7. A device according to claim 5, wherein said slides are fixedly attached to the arms, said guide track members comprise track bars slidably engaged by the slides, and said supporting frame means pivotally mounting proximal ends of the track bars.

8. A device according to claim 1, wherein said delivery conveyor comprises an endless belt conveyor carried by said frame means, said orbital cycle of the push bar effecting sweep of the bar from adjacent to one edge of the delivery conveyor to a limited distance beyond the opposite edge of the delivery conveyor, and common drive means driving said delivery conveyor and said operating means in coordinated relation.

9. A combination according to claim 8, including a take-away conveyor of a width to accept an entire row group thereacross and operating from adjacent to said opposite edge of said delivery conveyor to receive the row group of articles as displaced from the delivery conveyor by said push bar.

10. A device according to claim 1, wherein said push bar remains throughout said orbital cycle substantially parallel to a substantially straight line path of travel of the articles.

11. A device according to claim 1, wherein said operating means comprise at least one actuator connected to one of said arms, and means for stabilizing operation of the guide block means along the track means.

12. A device according to claim 11, wherein said stabilizing means comprise coupling bar means connecting the guide block means.

13. A device according to claim 12, wherein the operating means comprise an actuator coupled to said coupling bar means for effecting reciprocations of the coupling bar means and thereby reciprocations of the guide block means and the arms.

14. A device according to claim 1, wherein said operating means comprise air cylinder means, and means for controlling operation of the air cylinder means.

15. A device according to claim 1, including means for connecting the guiding block means and said arms and said push bar in a parallelogram system, and said operating means comprising a plurality of actuators coupled in operating relation in said system.

16. A device according to claim 15, wherein said actuators comprise air cylinders, and means for controlling operation of said air cylinders to actuate said parallelogram system for moving said push bar in said orbital cycle.

* * * * *